United States Patent
Ho et al.

(10) Patent No.: US 12,477,097 B1
(45) Date of Patent: Nov. 18, 2025

(54) GLASSES PROJECTION CONTROL SYSTEM AND GLASSES MASKING CONTROL SYSTEM

(71) Applicant: VACTRONICS TECHNOLOGIES INC., Miaoli County (TW)

(72) Inventors: Kun-Nien Ho, Miaoli County (TW); Sen-Tsung Hsiao, Miaoli County (TW); Yung-Sheng Chen, Miaoli County (TW)

(73) Assignee: Vactronics Technologies Inc., Miaoli County (TW)

( * ) Notice: Subject to any disclaimer, the term of this patent is extended or adjusted under 35 U.S.C. 154(b) by 0 days.

(21) Appl. No.: 18/770,944

(22) Filed: Jul. 12, 2024

(30) Foreign Application Priority Data

May 15, 2024 (TW) ................... 113117882

(51) Int. Cl.
*H04N 13/398* (2018.01)
*H04N 13/344* (2018.01)
*H04N 13/366* (2018.01)

(52) U.S. Cl.
CPC ......... *H04N 13/398* (2018.05); *H04N 13/344* (2018.05); *H04N 13/366* (2018.05)

(58) Field of Classification Search
CPC ........ G02B 2027/0178; G02B 27/0172; G02B 27/017; G02B 2027/014; G02B 27/0093; G02B 2027/0138; G02B 2027/0134; G02B 2027/0174; G02B 30/27; G02B 27/0075; G06F 3/013; G06F 3/012; G06F 3/005; G06F 3/0304; G06T 19/006; G06T 7/521; G06T 7/70; G06T 7/73; G06T 2207/10024; G06T 11/60; G06T 19/20; G06T 15/00
See application file for complete search history.

(56) References Cited

U.S. PATENT DOCUMENTS

2023/0258922 A1* 8/2023 Machida ............ G02B 27/0101 345/8
2023/0418063 A1* 12/2023 Pick ................... G01M 11/0228

* cited by examiner

*Primary Examiner* — Farhan Mahmud
(74) *Attorney, Agent, or Firm* — Wang Law Firm, Inc.

(57) ABSTRACT

A glasses projection control system includes: a CPU for outputting a first and a second projection information; a projection mechanism connected to the CPU for outputting a first and a second beams of light; a lens module used to refract the beams of light, when the first beam of light is projected onto the lens, a unfolded image is formed, when the second beam of light is projected onto the lens, it forms a hidden image which is smaller than the unfolded image, and the unfolded image is located in the center of the lens than the hidden image; and a detection system including an information acquisition unit and a computing unit, the information acquisition unit captures image or sound information, when determining that a person or object enters the detection range, the computing unit sends covert signal to the CPU to make it output the second projection information.

6 Claims, 7 Drawing Sheets

GLASSES PROJECTION CONTROL SYSTEM AND GLASSES MASKING CONTROL SYSTEM

BACKGROUND

Field of the Invention

The present invention relates to a kind of smart glasses, and more particularly to a glasses projection control system and glasses masking control system.

Description of Related Art

Existing projection glasses (e.g. Augmented reality glasses (AR) and mixed Reality glasses (MVR)) are used to project images onto LOE optical lenses through an optical machine and lens module for the user to view. However, the user's attention is usually focused on the image in front of the user when the image is being played. Therefore, if someone or an unexpected event requires immediate response from the user, the playing image will seriously interfere with the user, and pausing the projection will also cause inconvenience to the user. Therefore, a glasses projection control system that avoids interference with the user is needed.

SUMMARY

The present invention provides a glasses projection control system, the objective of which is to prevent the user from being interfered when communicating with the outside world, and does not have to pause the projection.

To achieve the above objective, a glasses projection control system provided by the present invention comprises:

A glasses projection control system, provided for application to smart glasses, the glasses projection control system comprises:
- a CPU used for computing work and provided for outputting a first projection information and a second projection information;
- a projection mechanism being connected to the CPU via information for receiving the first projection information and the second projection information, wherein the projection mechanism outputs a first beam of light and a second beam of light based on the first projection information and the second projection information;
- a lens module used to refract the first or second beam of light, so that the first or second beam of light is projected onto a lens to form an unfolded image or a hidden image, when the first beam of light is projected onto the lens, it forms the unfolded image, when the second beam of light is projected onto the lens, it forms the hidden image, the unfolded image is larger than the hidden image, and a position of the unfolded image is in a center of the lens compared with a position of the hidden image; and
- a detection system including an information acquisition unit and a computing unit which are connected via information, wherein the information acquisition unit is used to capture image or sound information, the computing unit is used to determine whether a person or object has entered a detection range based on the image or sound information captured by the information acquisition unit, the computing unit is also used to send a covert signal or a recovery signal, when determining that a person or object has entered the detection range, the computing unit sends the covert signal to the CPU, so that the CPU outputs the second projection information, and when determining that no one or object has entered the detection range, the computing unit sends the recovery signal to the CPU, so that the CPU outputs the first projection information.

It can be seen that the glasses projection control system of the present invention can capture external information through the information acquisition unit, and determine whether anyone or an object has entered the detection range through the computing unit. When it is determined that someone or an object has entered the detection range, the computing unit sends the covert signal to the CPU, so that the CPU outputs the second projection information, and when the second light is projected onto the lens, the hidden image is formed, thereby achieving the goal of avoiding interference when the user communicates with the outside world without pausing the projection.

DETAILED DESCRIPTION

Figure 4A:
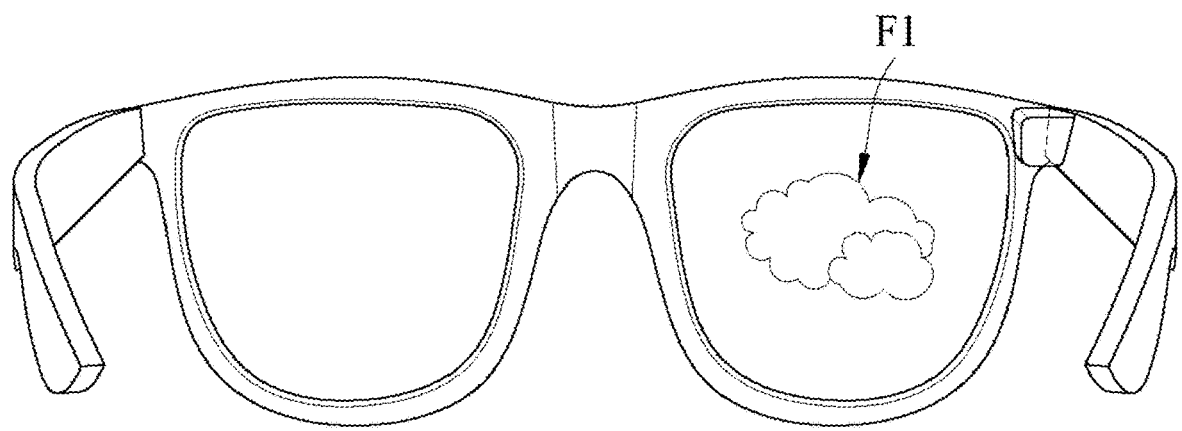
FIG. 4A is an illustrative view showing that an unfolded image projected on the lens.
Figure 4B:
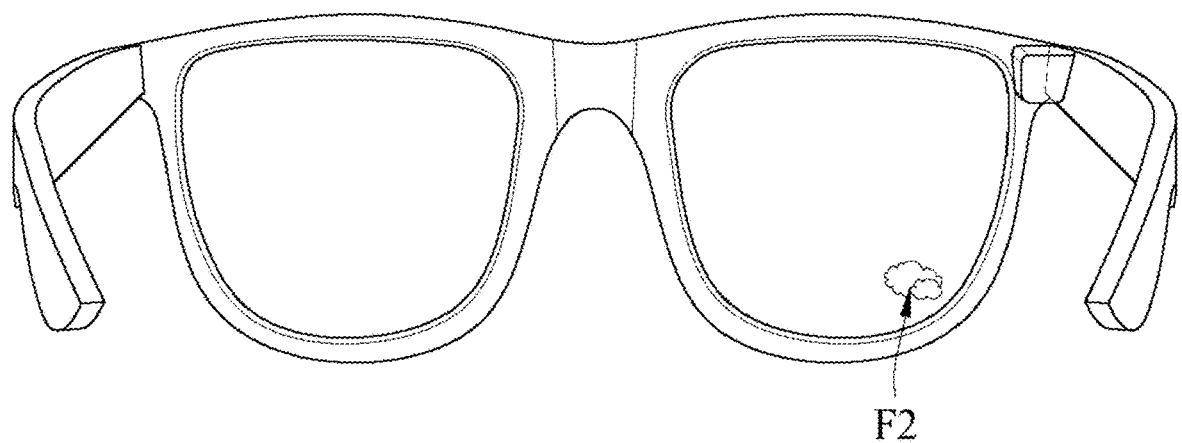
FIG. 4B shows the projection of the hidden image onto the lens.

The present invention provides a glasses projection control system for application to smart glasses A, which includes but is not limited to augmented reality glasses and mixed reality glasses. The glasses projection control system, please refer to FIGS. 1-5B, includes:

A CPU (central processing unit) 10 is used for computing work, which is used to output a first projection information and a second projection information. The CPU 10 can be a chip built into the smart glasses A, and can also be an external smart device, such as a smartphone;

A projection mechanism 20 is connected to the CPU 10 via information for receiving the first projection information and the second projection information. The projection mechanism 20 outputs a first beam of light and a second beam of light based on the first projection information and the second projection information. When the projection mechanism 20 receives the first projection information, it outputs the first beam of light. When the projection mechanism 20 receives the second projection information, it outputs the second beam of light. The projection mechanism 20 can include a plurality of light emitting devices 21 or one light emitting device 21, such as but not limited to an RGB laser diode (Red-Green-Blue laser diode);

A lens module 30 is used to refract the first or second beam of light, so that the first or second beam of light is projected onto a lens A1 to form an unfolded image F1 or a hidden image F2, as shown in FIGS. 4A and 4B. The lens module 30 includes, for example, but is not limited to, LOE (light-guide optical elements). When the first beam of light is projected onto the lens A1, it forms the unfolded image F1, and when the second beam of light is projected onto the lens A1, it forms the hidden image F2. The unfolded image F1 is larger than the hidden image F2, and the position of the unfolded image F1 is in the center of the lens A1 compared with the position of the hidden image F2.

A detection system 40 includes an information acquisition unit 41 and a computing unit 42 which are connected via information. The information acquisition unit 41 is used to capture image or sound information, which is installed on the smart glasses A. The information acquisition unit 41 can be a camera or a sound recorder. The computing unit 42 is used to determine whether a person or object has entered a detection range based on the image or sound information captured by the information acquisition unit 41. The computing unit 42 is also used to send a covert signal or a recovery signal. When the computing unit 42 determines that a person or object has entered the detection range, the computing unit 42 sends the covert signal to the CPU 10, so that the CPU 10 outputs the second projection information. When determining that no one or object has entered the detection range, the computing unit 42 sends the recovery signal to the CPU 10, so that the CPU 10 outputs the first projection information. When the information acquisition unit 41 is used to capture images, the computing unit 42 includes, for example, but not limited to, a motion detection program for Python and OpenCV, or a Single Shot MultiBox Detector (SSD), You Only Look Once (YOLO) object detection model. When the information acquisition unit 41 is used to capture sound information, the computing unit 42 is used to determine the volume of the sound to determine whether there is anyone or an object entering the detection range. For example, when the information acquisition unit 41 is a camera, the detection range can be approximately 1-1.5 meters away from the information acquisition unit 41.

It can be seen that the glasses projection control system of the present invention can capture external information through the information acquisition unit 41, and determine whether anyone or an object has entered the detection range through the computing unit 42. When it is determined that someone or an object has entered the detection range, the computing unit 42 sends the covert signal to the CPU 10, so that the CPU 10 outputs the second projection information, and when the second light is projected onto the lens A1, the hidden image F2 is formed, thereby achieving the goal of avoiding interference when the user communicates with the outside world without pausing the projection.

When the computing unit 42 determines that no one or object has entered the detection range, it sends the recovery signal to the CPU 10, so that the CPU 10 outputs the first projection information, and the projection mechanism 20 outputs the first beam of light. The unfolded image F1 is formed when the first beam of light is projected onto the lens A1, allowing the user to view the image normally again.

Figure 1:
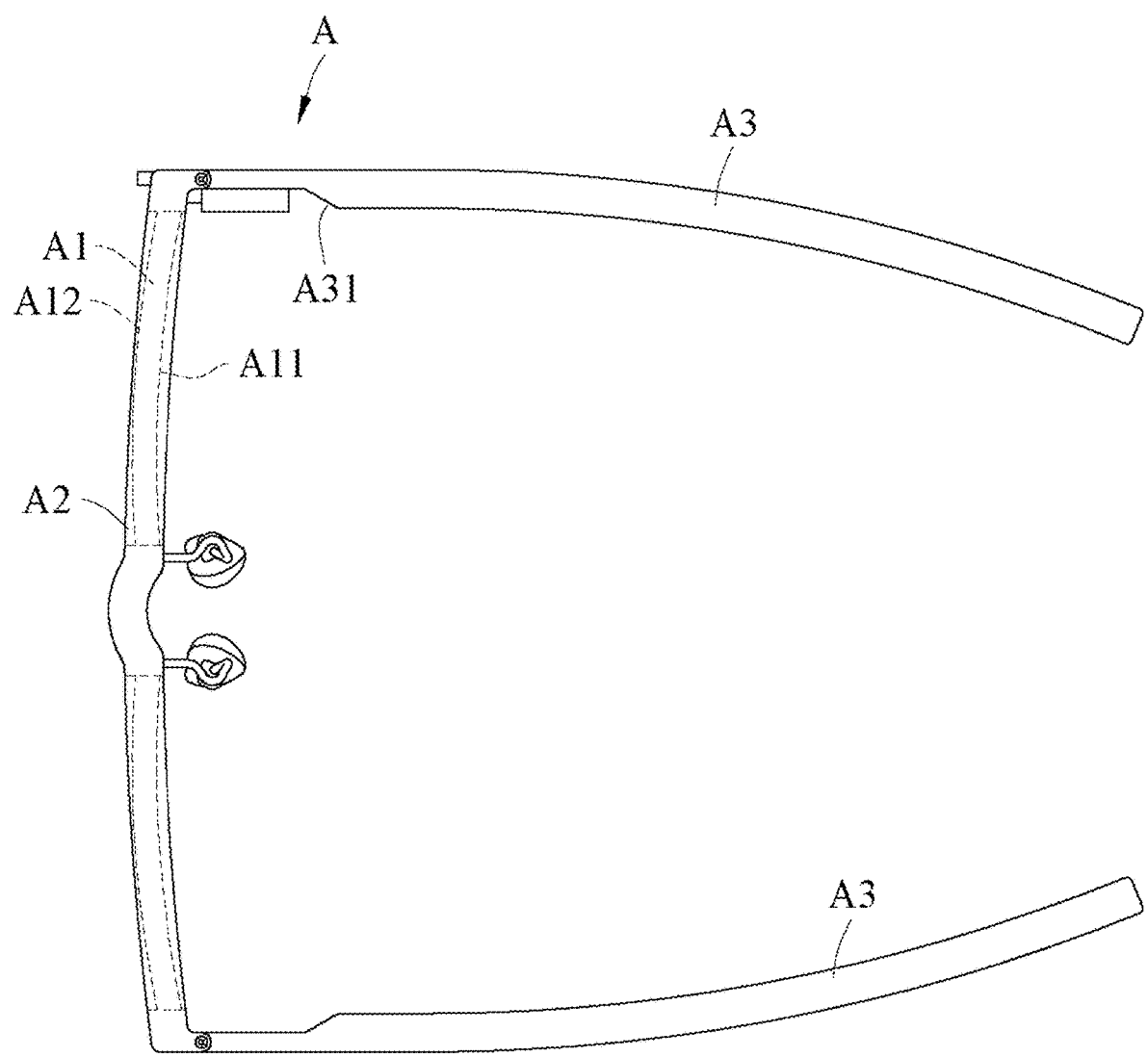
FIG. 1 is an illustrative view of the glasses projection control system and the glasses masking control system.
Figure 2A:
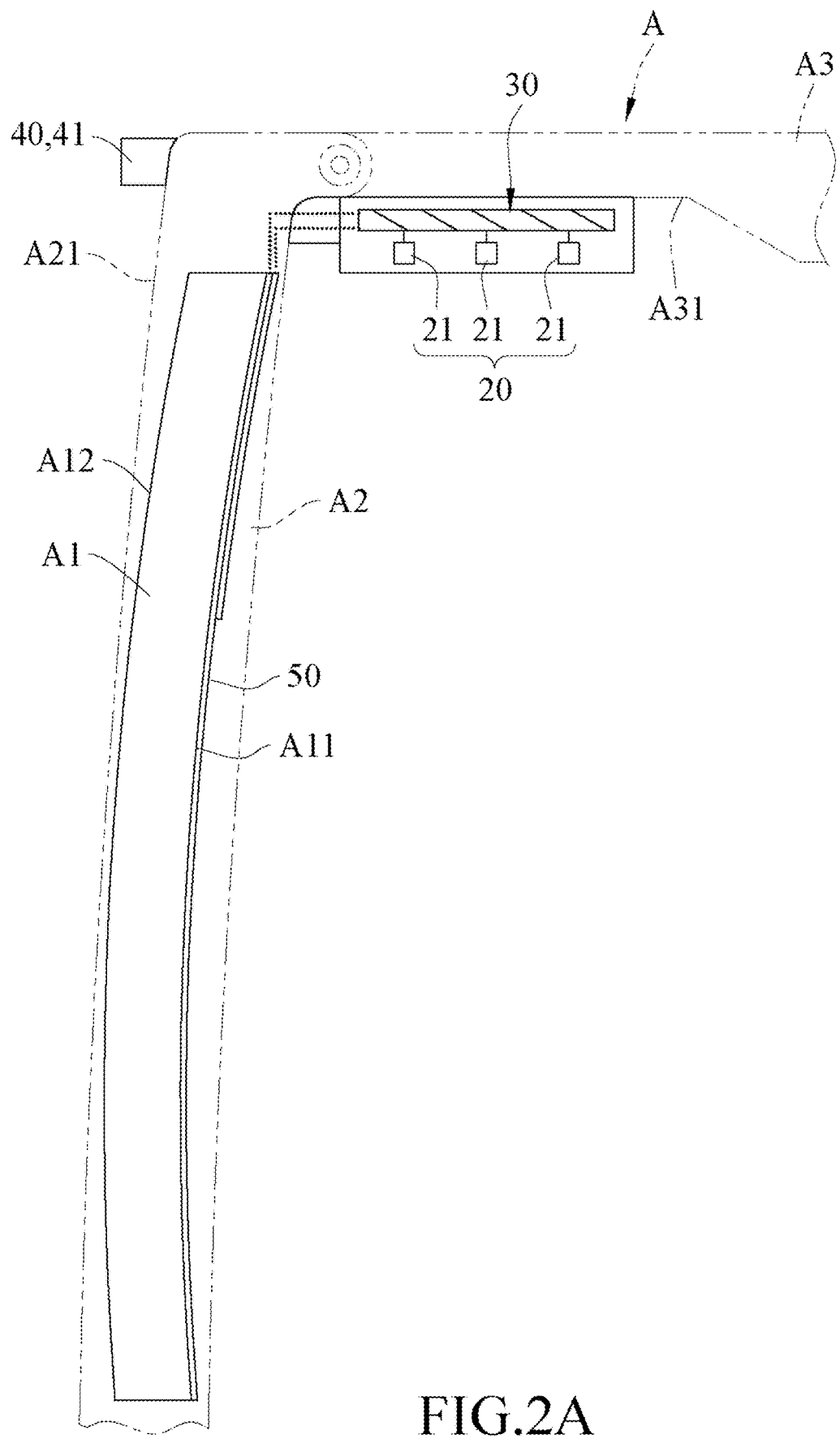
FIG. 2A is an illustrative view of a part of the glasses projection control system and the glasses masking control system.
Figure 2B:
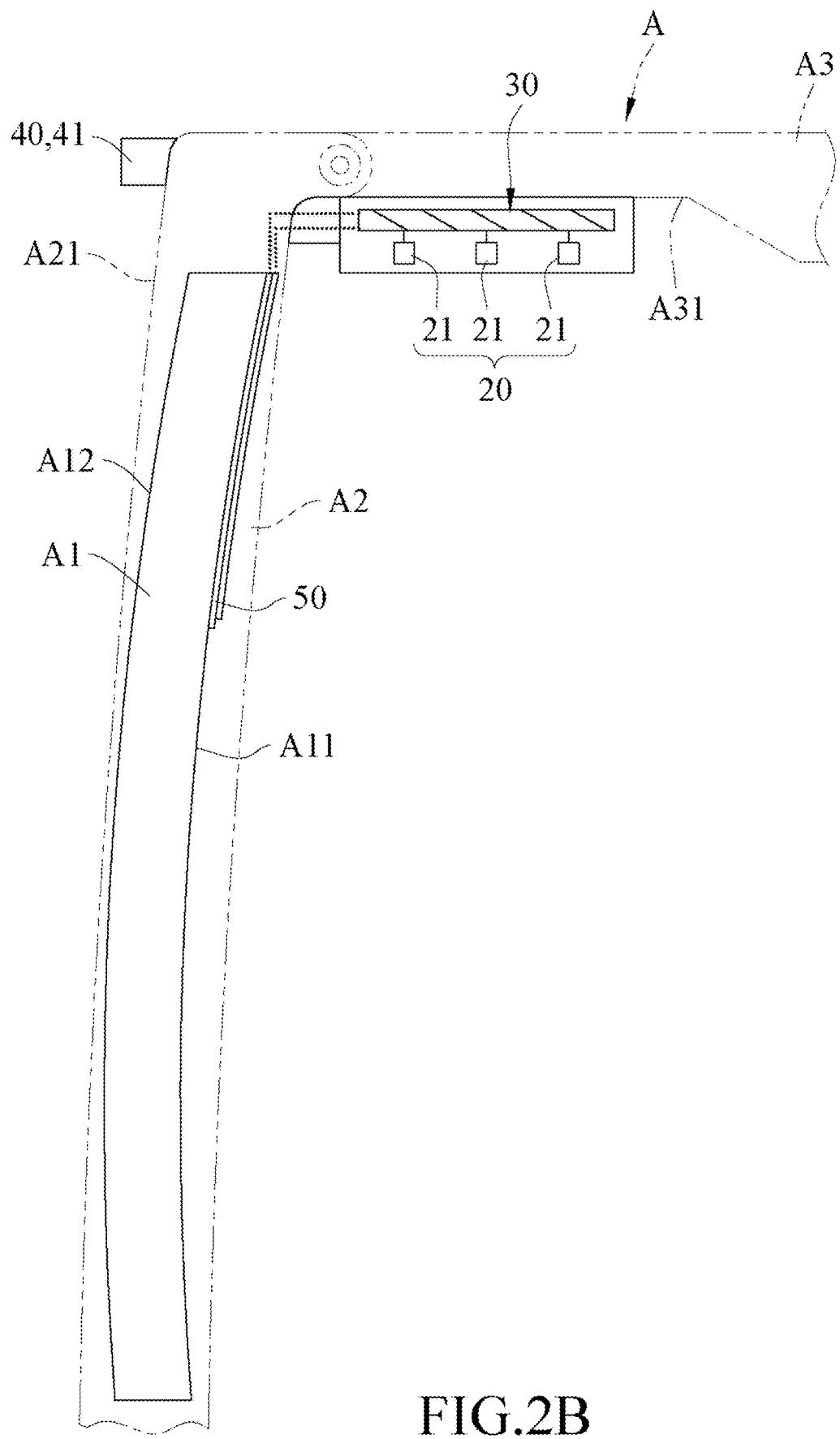
FIG. 2B is an illustrative view of a part of the glasses projection control system and the glasses masking control system in accordance with another embodiment of the present invention.
Figure 3:
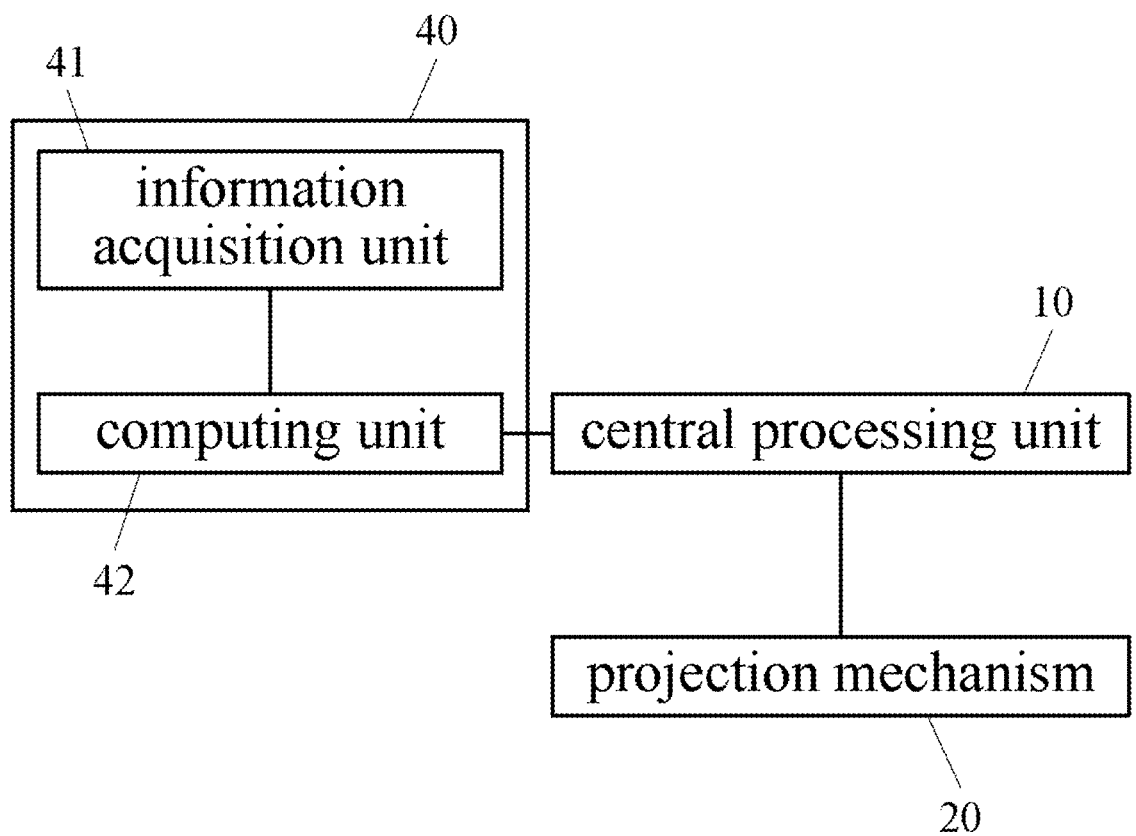
FIG. 3 is a schematic diagram of the glasses projection control system.
Figure 5A:
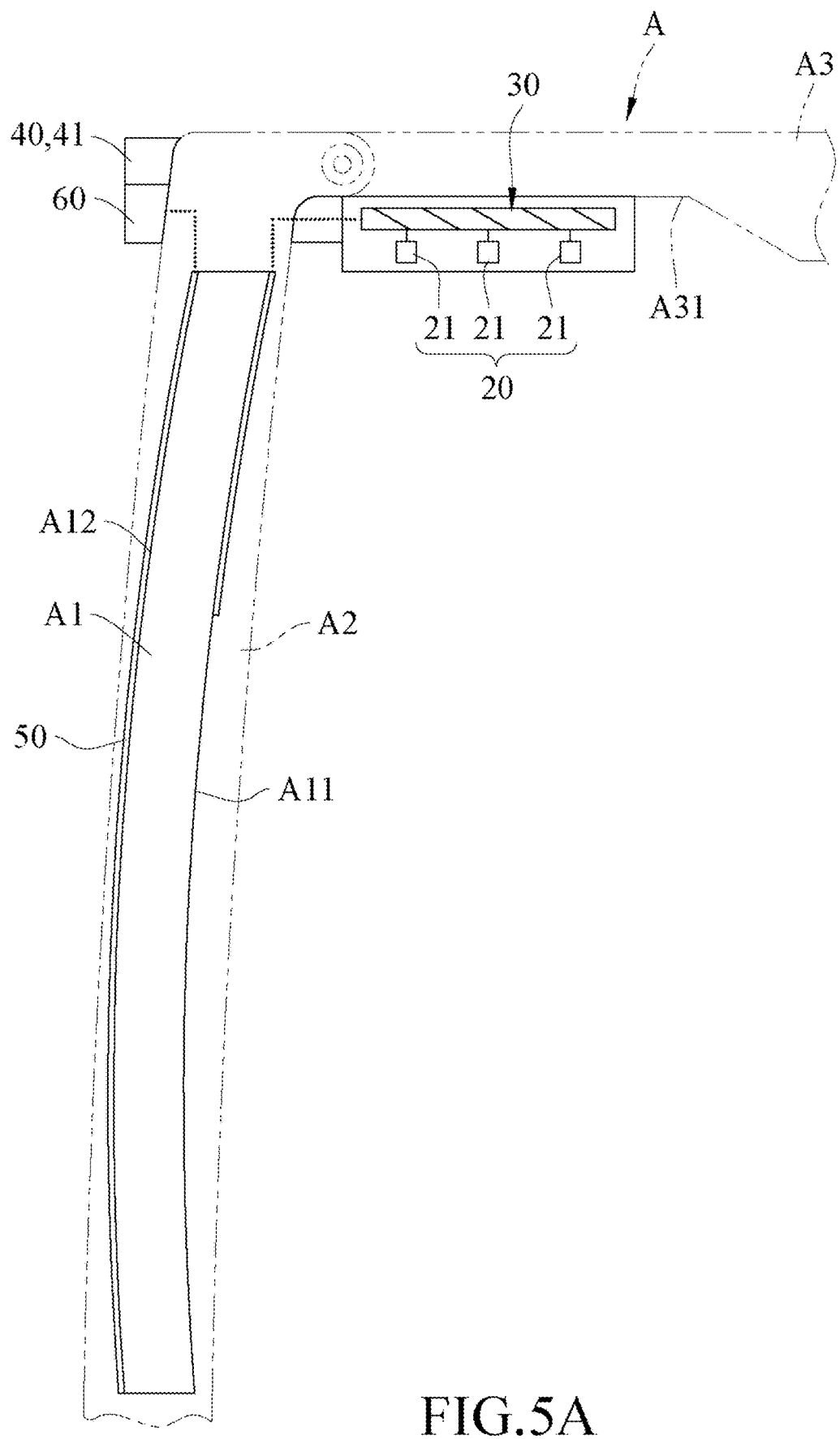
FIG. 5A is an illustrative view of a part of the glasses projection control system and the glasses masking control system in accordance with another embodiment of the present invention.
Figure 5B:
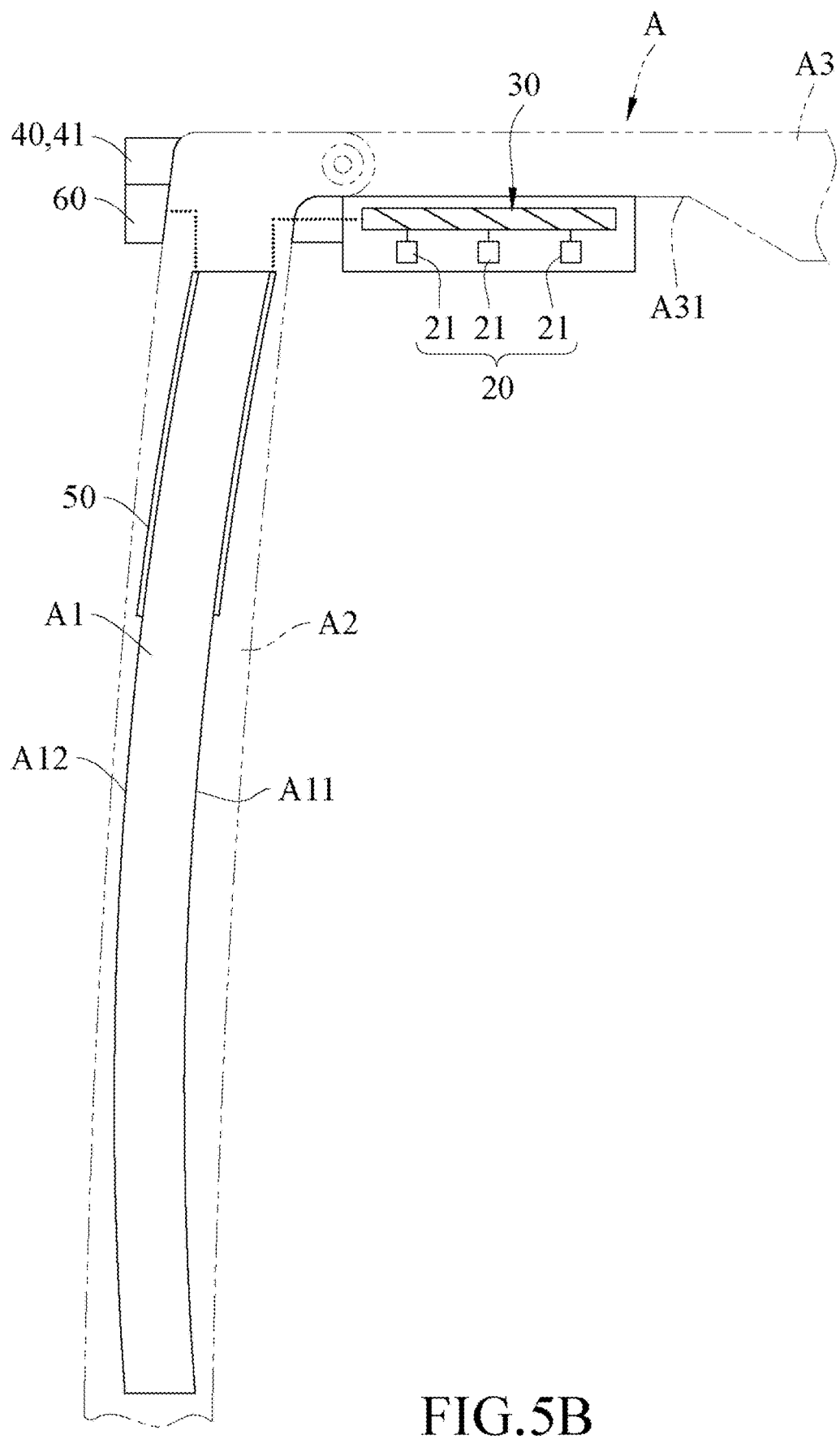
FIG. 5B is an illustrative view of a part of the glasses projection control system and the glasses masking control system in accordance with another embodiment of the present invention.

The present invention also provides a glasses masking control system for application to smart glasses A. The smart glasses A include but are not limited to augmented reality glasses and mixed reality glasses. The lens A1 of the smart glasses A includes an inner surface A11 and an opposite outer surface A12. The smart glasses A include a frame A2 and two lens legs A3 connected to two opposite lateral edges of the frame A2. The glasses masking control system, please refer to FIG. 1, includes:

A masking layer 50, located on the inner surface A11 or the outer surface A12 of the lens A1, may include a photochromic element or an electrochromic element, as shown in FIGS. 2A and 2B. The masking layer 50 may fully cover the lens A1 or is only coated on a part of the lens A1;

A control unit 60 is used to control the color change of the masking layer 50, and is installed on the smart glasses A. When the masking layer 50 includes a photochromic element, the control unit 60 is an ultraviolet emitter, as shown in FIGS. 2A and 2B. When the masking layer 50 is located on the inner surface A11 of the lens A1, the control unit 60 is installed on an inner surface A31 of the lens legs A3, as shown in FIGS. 5A and 5B. When the masking layer 50 is located on the outer surface A12 of the lens A1, the control unit 60 is installed on the outer surface A21 of the lens frame A2. When the masking layer 50 includes an electrochromic element, the control unit 60 is a power supply device, which is electrically connected to the masking layer 50;

A detection system 40 includes an information acquisition unit 41 and a computing unit 42 which are connected via information. The computing unit 42 is connected to the control unit 60 via information, and the information acquisition unit 41 is used to capture image information or sound information. The information acquisition unit 41 is installed on smart glasses A. The information acquisition unit 41 can be a camera or a sound recorder. The computing unit 42 is used to determine whether a person or object has entered a detection range based on the image information or sound information captured by the information acquisition unit 41. The computing unit 42 is also used to send a covert signal or a recovery signal. When the computing unit 42 determines that a person or object has entered the detection range, the computing unit 42 sends the covert signal to the control unit 60, so that the control unit 60 emits ultraviolet light or increases the voltage to change the color of the masking layer 50, in order to achieve the masking effect. When the computing unit 42 determines that no one or object has entered the detection range, the computing unit 42 sends the recovery signal to the control unit 60 to terminate the emission of ultraviolet light or reduce the voltage to make the masking layer 50 transparent again. When the information acquisition unit 41 is used to capture images, the computing unit 42 includes, for example, but not limited to, a motion detection program for Python and OpenCV, or a Single Shot MultiBox Detector (SSD), You Only Look Once (YOLO) object detection model. When the information acquisition unit 41 is used to capture sound information, the computing unit 42 is used to determine the volume of the sound to determine whether there is anyone or an object entering the detection range.

It can be seen that the glasses projection control system of the present invention can capture external information through the information acquisition unit 41, and determine whether anyone or an object has entered the detection range through the computing unit 42. When it is determined that someone or an object has entered the detection range, the computing unit 42 sends the covert signal to the control unit 60, so that the control unit 60 controls the masking layer 50 to change color to avoid external personnel from peering into the contents projected on the user's lens A1.

When the computing unit 42 determines that no one or object has entered the detection range, it sends the recovery signal to the control unit 60, so that the control unit 60 makes the masking layer 50 transparent again.

What is claimed is:

1. A glasses projection control system, provided for application to smart glasses, the glasses projection control system comprising:
   a CPU used for computing work and provided for outputting a first projection information and a second projection information;
   a projection mechanism being connected to the CPU via information for receiving the first projection information and the second projection information, wherein the projection mechanism outputs a first beam of light and a second beam of light based on the first projection information and the second projection information;
   a lens module used to refract the first or second beam of light, so that the first or second beam of light is projected onto a lens to form an unfolded image or a hidden image, when the first beam of light is projected onto the lens, it forms the unfolded image, when the second beam of light is projected onto the lens, it forms the hidden image, the unfolded image is larger than the hidden image, and a position of the unfolded image is in a center of the lens compared with a position of the hidden image; and
   a detection system including an information acquisition unit and a computing unit which are connected via information, wherein the information acquisition unit is used to capture image or sound information, the computing unit is used to determine whether a person or object has entered a detection range based on the image or sound information captured by the information acquisition unit, the computing unit is also used to send a covert signal or a recovery signal, when determining that a person or object has entered the detection range, the computing unit sends the covert signal to the CPU, so that the CPU outputs the second projection information, and when determining that no one or object has entered the detection range, the computing unit sends the recovery signal to the CPU, so that the CPU outputs the first projection information.

2. The glasses projection control system as claimed in claim 1, wherein the projection mechanism includes a plurality of light emitting devices, and the light emitting devices are Red-Green-Blue laser diodes.

3. The glasses projection control system as claimed in claim 1, wherein the lens module includes light-guide optical elements.

4. The glasses projection control system as claimed in claim 1, wherein the information acquisition unit is a camera or a sound recorder.

5. The glasses projection control system as claimed in claim 1, wherein the information acquisition unit is used to capture sound information, and the computing unit is used to determine the volume of sound.

6. The glasses projection control system as claimed in claim 1, wherein the information acquisition unit is used to capture images, and the computing unit is selected from a group consisting of a motion detection program for Python and OpenCV, a Single Shot MultiBox Detector, and You Only Look Once object detection model.

* * * * *